US011952719B2

(12) United States Patent
Mongrain

(10) Patent No.: US 11,952,719 B2
(45) Date of Patent: Apr. 9, 2024

(54) FOLDABLE PAPER-BASED SUBSTRATES COATED WITH WATER-BASED COATINGS AND PROCESS FOR COATING FOLDABLE PAPER-BASED SUBSTRATES

(71) Applicant: Cascades Sonoco Inc., Kingsey Falls (CA)

(72) Inventor: Yvon Mongrain, Lanoraie (CA)

(73) Assignee: Cascades Sonoco Inc., Kingsey Falls (CA)

( * ) Notice: Subject to any disclaimer, the term of this patent is extended or adjusted under 35 U.S.C. 154(b) by 828 days.

(21) Appl. No.: 17/060,811

(22) Filed: Oct. 1, 2020

(65) Prior Publication Data

US 2021/0017714 A1 Jan. 21, 2021

Related U.S. Application Data

(63) Continuation of application No. 14/904,222, filed as application No. PCT/CA2014/050665 on Jul. 14, 2014, now Pat. No. 10,829,894.

(Continued)

(51) Int. Cl.

*D21H 19/72* (2006.01)
*D21H 19/10* (2006.01)

(Continued)

(52) U.S. Cl.

CPC ........... *D21H 19/72* (2013.01); *D21H 5/0005* (2013.01); *D21H 19/10* (2013.01); *D21H 19/22* (2013.01);

(Continued)

(58) Field of Classification Search

CPC ........ D21H 19/72; D21H 5/005; D21H 19/10; D21H 19/22; D21H 19/82; D21H 19/824;

(Continued)

(56) References Cited

U.S. PATENT DOCUMENTS

| | | | |
|---|---|---|---|
| 4,087,397 | A | 5/1978 | Martorano et al. |
| 5,654,039 | A | 8/1997 | Wenzel et al. |

(Continued)

FOREIGN PATENT DOCUMENTS

| | | | |
|---|---|---|---|
| EP | 2077238 | A1 | 7/2009 |
| WO | 2012134695 | A1 | 10/2012 |

OTHER PUBLICATIONS

Findenig, G. et al., Creating Water Vapor Barrier Coatings from Hydrophilic Components, ACS Applied Materials & Interfaces, ACS Publications, vol. 4 No. 6, p. 3199-3206, 2012 (Abstract).

(Continued)

*Primary Examiner* — K. Boyle
(74) *Attorney, Agent, or Firm* — Eversheds Sutherland (US) LLP

(57) ABSTRACT

A foldable paper-based substrate coated with primer coat and top coat. Primer coat includes a wax-free aqueous dispersion wherein a dry film thereof has a flexibility of at least 1100% for a film thickness from about 1.0 to about 2.5 mm. Top coat is blocking resistant and includes an aqueous dispersion of a polymer providing water resistance, grease or oil resistance, heat resistance, odor barrier, moisture barrier and/or heat sealability to the paper-based product. The top coat aqueous dispersion is characterized in that a dry film thereof has a flexibility of at least 570% for a film thickness from about 1.5 to about 2.5 mm. A process for preparing the coated foldable paper-based substrate includes applying the primer coat to the surface of the paper-based substrate, applying the top coat and drying the coats. The primer coat may be dried before application of the top coat.

20 Claims, 1 Drawing Sheet

Related U.S. Application Data

(60) Provisional application No. 61/845,434, filed on Jul. 12, 2013.

(51) Int. Cl.

| | |
|---|---|
| ***D21H 19/22*** | (2006.01) |
| ***D21H 19/82*** | (2006.01) |
| ***D21H 21/14*** | (2006.01) |
| ***D21H 21/16*** | (2006.01) |
| ***D21H 23/22*** | (2006.01) |
| *B05D 7/00* | (2006.01) |

(52) U.S. Cl.
CPC ........... *D21H 19/82* (2013.01); *D21H 19/824* (2013.01); *D21H 21/14* (2013.01); *D21H 21/16* (2013.01); *B05D 7/546* (2013.01); *B05D 2203/22* (2013.01); *Y10T 428/31906* (2015.04)

(58) Field of Classification Search
CPC ........ D21H 21/14; D21H 21/16; B05D 7/546; B05D 2203/22; Y10T 428/31906
See application file for complete search history.

(56) References Cited

U.S. PATENT DOCUMENTS

| | | | |
|---|---|---|---|
| 5,763,100 | A | 6/1998 | Quick et al. |
| 5,773,131 | A | 6/1998 | Dettling |
| 5,837,383 | A | 11/1998 | Wenzel et al. |
| 5,868,309 | A | 2/1999 | Sandstrom et al. |
| 5,935,664 | A | 8/1999 | Robinson et al. |
| 6,133,168 | A | 10/2000 | Doyle et al. |
| 6,268,440 | B1 | 7/2001 | Kudo et al. |
| 6,866,383 | B2 | 3/2005 | Naik et al. |
| 7,452,927 | B2 | 11/2008 | Hayes |
| 8,048,514 | B2 | 11/2011 | Musig et al. |
| 8,329,309 | B2 | 12/2012 | Leplatois et al. |
| 9,200,409 | B2 | 12/2015 | Hartmann et al. |
| 2004/0121080 | A1* | 6/2004 | Urscheler .............. D21H 19/82 427/420 |
| 2004/0131871 | A1 | 7/2004 | Lee et al. |
| 2007/0292643 | A1 | 12/2007 | Renn |
| 2008/0095989 | A1 | 4/2008 | Eubanks et al. |
| 2010/0086746 | A1 | 4/2010 | Kersnick et al. |
| 2010/0210745 | A1 | 8/2010 | McDaniel et al. |
| 2010/0233146 | A1 | 9/2010 | McDaniel |
| 2011/0020556 | A1 | 1/2011 | Satgurunathan et al. |
| 2011/0020629 | A1 | 1/2011 | Mussig et al. |
| 2011/0027601 | A1 | 2/2011 | Ruffner, Jr. et al. |
| 2011/0046284 | A1 | 2/2011 | Berube et al. |
| 2011/0097530 | A1 | 4/2011 | Gohil et al. |
| 2013/0084437 | A1 | 4/2013 | McGee |

OTHER PUBLICATIONS

Bollstrom, R. et al., A multilayer coated fiber-based substrate suitable for printed functionality, Organic Electronics, vol. 10, p. 1020-23, 2009.

Tappi "Grease resistance test for paper and paperboard, Test Method T 559 cm-12" https://imisrise.tappi.org/TAPPI/Products/01/T/0104T559.aspx retrieved Feb. 2018 (Year: 2018).

Best Practices Manual Pulp & Paper Industry, 2012, Confederation of Indian Industry, vol. 5, pp. 1-2, 141-44.

Bondareva et al., "Relationship between the Strengths of the Composite and Binder", Macromolecular Chemistry and Polymeric Materials, Russian Journal of Applied Chemistry, 2009, vol. 82, No. 9, pp. 1620-1623.

* cited by examiner

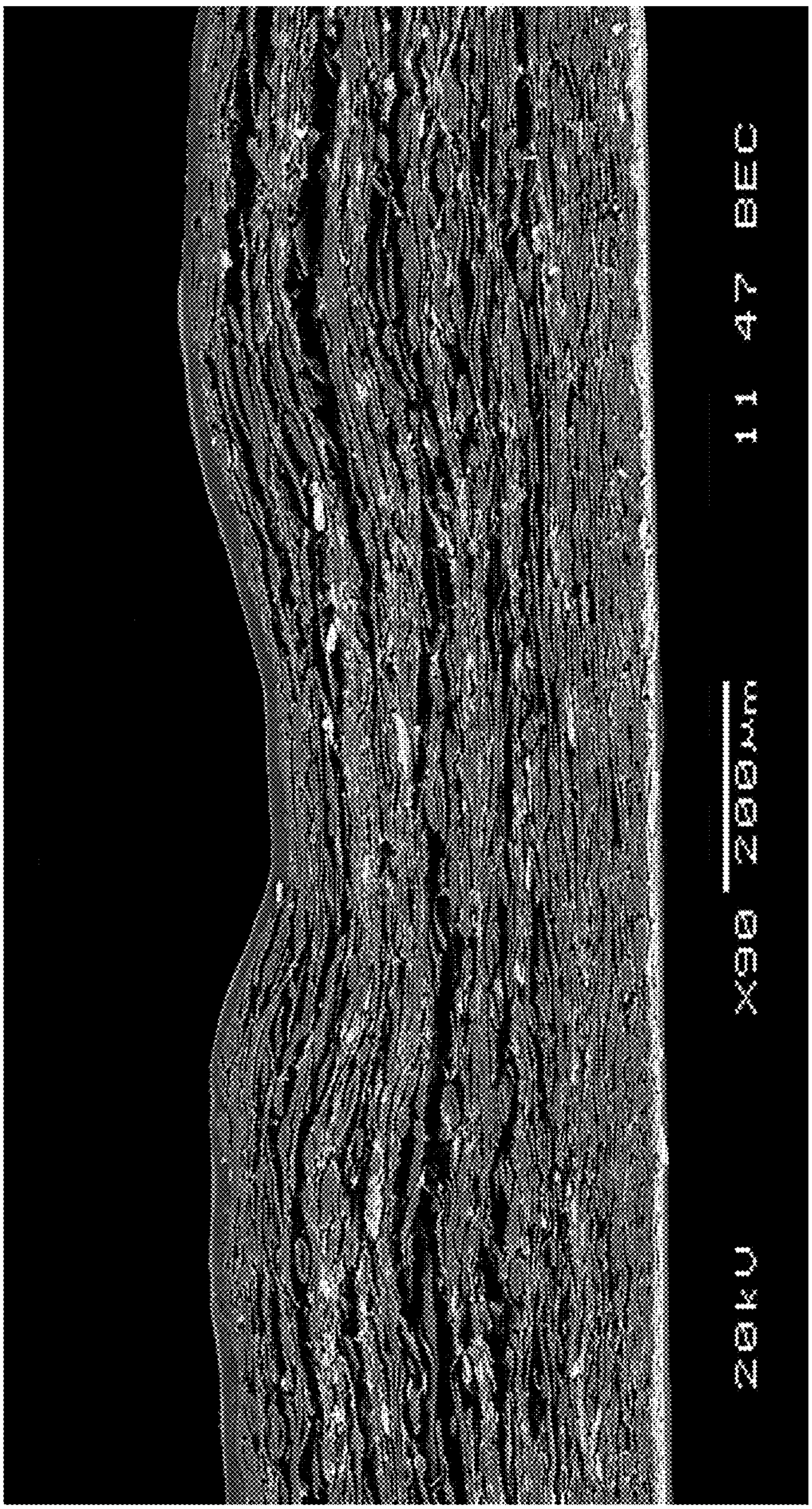
20kV X90 200µm 11 47 BEC

FOLDABLE PAPER-BASED SUBSTRATES COATED WITH WATER-BASED COATINGS AND PROCESS FOR COATING FOLDABLE PAPER-BASED SUBSTRATES

CROSS-REFERENCE TO RELATED APPLICATIONS

This application is a continuation of U.S. application Ser. No. 14/904,222, filed Jan. 11, 2016, which is the U.S. national stage of PCT/CA2014/050665, filed Jul. 14, 2014, which claims priority to U.S. Provisional Application No. 61/845,434, filed Jul. 12, 2013, all of which are incorporated herein by reference.

TECHNICAL FIELD

The technical field relates to foldable paper-based substrates coated with water-based coatings, to a process for coating a paper-based substrate with such water-based coatings and to resulting foldable coated paper-based substrates. The coatings provide some barrier and/or resistance properties to the paper-based substrates.

TECHNICAL BACKGROUND

In the paper industry, coatings based on polyethylene are generally used to provide grease or oil resistance, water resistance and/or heat resistance to the paper products coated with such coatings. Polyethylene based coatings may also be used as odor barriers. These types of coatings which present some flexibility are useful for making foldable cardboard and still maintaining integrity of the barriers in boxes erected from such foldable cardboard. However, even though polyethylene coatings are recyclable, it is not possible to repulp the cardboard coated with such coatings.

Water-based coatings are seen as more environmental-friendly alternative to polyethylene coatings since they can be recycled and repulped. However, known water-based coatings are not suitable for foldable cardboard since cracks form in the folds, resulting in a decrease of the barrier properties.

In light of the aforementioned, there is a need for an environmentally friendly alternative to polyethylene coatings for foldable paper-based products.

BRIEF SUMMARY

It is therefore an aim of the present invention to address the above mentioned issues.

In one aspect, there is provided a foldable paper-based substrate coated on at least one surface with:

a primer coat comprising a wax-free aqueous dispersion characterized in that a dry film of said aqueous dispersion has a flexibility of at least 1100% for a film thickness from about 1.0 to about 2.5 mm, and a top coat comprising an aqueous dispersion of a polymer or copolymer capable of providing at least one of water resistance, grease or oil resistance, heat resistance, an odor barrier, a moisture barrier, heat sealability to the paper-based product once coated, wherein said top coat is blocking resistant and said top coat aqueous dispersion is characterized in that a dry film thereof has a flexibility of at least 570% for a film thickness from about 1.5 to about 2.5 mm.

There is also provided a foldable paper-based substrate coated on at least one surface with:

a primer coat comprising a wax-free aqueous dispersion of a styrene-acrylate copolymer, styrene-acrylonitrile copolymer, styrene-butadiene copolymer, styrene-acrylonitrile-acrylate copolymer or any mixture of these copolymers, said wax-free aqueous dispersion being characterized in that a dry film thereof has a flexibility measured as the percentage of elongation-to-break of at least 1100% for a film thickness from about 1.0 to about 2.5 mm, and a top coat comprising an aqueous dispersion of a polymer or copolymer capable of providing at least one of water resistance, grease or oil resistance, heat resistance, an odor barrier, a moisture barrier, heat sealability to the paper-based product once coated, wherein said top coat is blocking resistant and said top coat aqueous dispersion is characterized in that a dry film thereof has a flexibility measured as the percentage of elongation-to-break of at least 570% for a film thickness from about 1.5 to about 2.5 mm.

In an optional aspect, the primer coat aqueous dispersion is characterized in that a dry film thereof has a flexibility of at least 1350% for a film thickness from about 1.5 to about 2 mm.

In another optional aspect, the primer coat aqueous dispersion is characterized in that a dry film thereof has a flexibility of at least 1500% for a film thickness from about 1.6 to about 1.7 mm.

In another optional aspect, the top coat aqueous dispersion is characterized in that a dry film thereof has a flexibility of at least 600% for a film thickness from about 1.6 to about 1.7 mm.

In another optional aspect, the primer coat has a solids content from about 30 wt % to about 70 wt %.

In another optional aspect, the primer coat has a solids content from about 45 wt % to about 55 wt %.

In another optional aspect, the top coat has a solids content from about 10 wt % to about 70 wt %.

In another optional aspect, the top coat has a solids content from about 20 wt % to about 40 wt %.

In another optional aspect, the top coat has a solids content from about 25 wt % to about 37 wt %.

In another optional aspect, the primer coat has a viscosity from about 50 cP to about 10000 cP as measured on a Brookfield viscometer at 20 rpm with a spindle 3.

In another optional aspect, the primer coat has a viscosity of from about 100 cP to about 5000 cP as measured on a Brookfield viscometer at 20 rpm with a spindle 3.

In another optional aspect, the primer coat has a viscosity of about 4500 cP as measured on a Brookfield viscometer at 20 rpm with a spindle 3.

In another optional aspect, the top coat has a viscosity from about 40 cP to about 10000 cP as measured on a Brookfield viscometer at 20 rpm with a spindle 3.

In another optional aspect, the top coat has a viscosity from about 40 cP to about 250 cP as measured on a Brookfield viscometer at 20 rpm with a spindle 3.

In another optional aspect, the primer coat further comprises a wax-free aqueous dispersion of an acrylic polymer, an acrylic copolymer, a polyurethane, a polyvinylalcohol, a polyvinylacetate, a dextrin, a modified starch, an asphalt emulsion, corn starch, polyethylene, nylon, polypropylene, a polyhydroxyalkanoate or any mixtures thereof.

In another optional aspect, the primer coat comprises a styrene-butadiene copolymer or a styrene-acrylonitrile-acrylate copolymer.

In another optional aspect, the primer coat comprises BASF Styronal® BN 4606 X or Epotal® NX 4646, or the product commercialized under the reference XU 31616 by Styron.

In another optional aspect, the primer coat comprises a copolymer of n-butylacrylate, styrene and acrylonitrile.

In another optional aspect, the primer coat comprises Acronal® S 504.

In another optional aspect, the primer coat comprises Tribinder or Aqualene® 5050.

In another optional aspect, the primer coat further comprises a thickening agent.

In another optional aspect, the primer coat comprises Acronal® S 504 and an acrylic acid-acrylamide thickening agent.

In another optional aspect, the thickening agent is Sterocoll® BL or Sterocoll® FS.

In another optional aspect, the thickening agent is present in the primer coat in less than about 1% by weight of the total weight of the primer coat.

In another optional aspect, the primer coat further comprises a defoaming agent.

In another optional aspect, the defoaming agent is Advantage M125™, Etingal® L, Foambrake® 798 or Foamblast® 301S.

In another optional aspect, the top coat comprises an acrylic based polymer or copolymer, a styrene-butadiene copolymer, a styrene-acrylate copolymer, a styrene-acrylonitrile copolymer, a styrene-acrylonitrile-acrylate copolymer, a polyurethane, a polyvinylalcohol, a polyvinylacetate, a dextrin, a modified starch, an asphalt emulsion, corn starch, polyethylene, nylon, polypropylene, a polyhydroxyalkanoate, or any mixtures thereof.

In another optional aspect, the top coat is mineral charge-free.

In another optional aspect, the top coat comprises Michem®Coat 81, Michem®Coat 82, Spectra-Guard™ 3007BK, Spectra-Guard™ 3003, VaporCoat® 2200R, Cartabond® SMH Liquid, ESACOTE® PU DP 170/N or Aqualene® 5050.

In another optional aspect, the top coat comprises Spectra-Guard™ 3007BK, Spectra-Guard™ 3003 or VaporCoat® 2200R.

In another optional aspect, the top coat comprises Tribinder.

In another optional aspect, the top coat is wax-free.

In another optional aspect, the primer coat comprises Acronal® S 504 and the top coat comprises Spectra-Guard™ 3007BK or Spectra-Guard™ 3003.

In another optional aspect, the foldable paper-based substrate is coated on at least one surface with a primer coat and a top coat, wherein the primer coat has a viscosity of about 4500 cP and comprises Acronal® S 504 and the top coat has a viscosity of about 40 cP to about 250 cP and comprises Spectra-Guard™ 3007BK, the viscosity being measured on a Brookfield viscometer at 20 rpm with a spindle 3.

In an optional aspect, the paper-based substrate is a recycled or virgin liner, medium, fine paper, newspaper, chipboard, kraftpak paper, paperboard, molded pulp, or any other cellulosic fiber-based substrate.

In another optional aspect, the paper-based substrate has a basis weight from about 40 $g/m^2$ to about 1000 $g/m^2$.

In another optional aspect, the paper-based substrate has a basis weight from about 200 $g/m^2$ to about 400 $g/m^2$.

In another aspect, there is provided a process for preparing a coated foldable paper-based substrate as described herein, comprising:

applying the primer coat to at least one surface of the paper-based substrate, drying the primer coat, applying the top coat over the dried primer coat, and drying the top coat.

In an optional aspect, the process further comprises repeating applying the primer coat, drying the primer coat, applying the top coat and drying the top coat to the other surface of the foldable paper-based product.

In another optional aspect, the primer coat is applied to the surface of the paper in a quantity from about 5 to about 20 $g/m^2$.

In another optional aspect, the primer coat is applied to the surface of the paper in a quantity from about 10 to about 13 $g/m^2$.

In another optional aspect, the top coat is applied to the dried primer coat in a quantity from about 0.1 to about 15 $g/m^2$.

In another optional aspect, the top coat is applied to the dried primer coat in a quantity from about 0.5 to about 5 $g/m^2$.

In another optional aspect, the primer coat is dried at a temperature from about 40° C. to about 95° C.

In another optional aspect, the primer coat is dried at a temperature from about 50° C. to about 70° C.

In another optional aspect, the top coat is dried at a temperature from about 40° C. to about 95° C.

In another optional aspect, the top coat is dried at a temperature from about 60° C. to about 80° C.

In another optional aspect, the primer coat is applied and dried using a first coating/drying system and the top coat is applied and dried using a second coating/drying system, the two systems being positioned in series.

In another optional aspect, the paper-based substrate is substantially flat and the primer coat and top coat are applied using a rod coater, a blade coater, an air knife coater, a curtain coater, a slot die coater, an iso-bar rod coater, a gravure coater, a reverse gravure coater or by flexography.

In another optional aspect, the primer coat and top coat are applied using a rod coater, a blade coater, or a curtain coater.

In another optional aspect, the primer coat and top coat are applied using a rod coater where the rod is provided with a resilient tip metering element.

In another optional aspect, the rod provided with a resilient tip metering element is an INVO® Tip.

In another optional aspect, a curtain coater is used to apply the primer coat and top coat and either the primer coat or the top coat or both are applied in multiple layers.

In another optional aspect, the paper-based substrate is molded pulp and the primer coat and top coat are applied using a shower or a sprayer.

In another aspect, there is provided a process for preparing a coated foldable paper-based substrate as described herein, comprising:

applying the primer coat on at least one surface of the paper-based substrate;

applying the top coat over the primer coat; and drying the coats;

wherein applying the primer coat and top coat is performed using a curtain coater or a slot die coater.

In optional aspect, the above mentioned processes further comprise a step of scoring the coated paper-based substrate.

In another optional aspect, the above mentioned processes further comprise a step of folding the paper-based substrate.

In another aspect, there is provided a coated foldable paper-based substrate obtained by the processes described herein.

In another aspect, where the process further comprises a step of folding the paper-based substrate, there is also provided a coated folded paper-based substrate obtained by such process.

In another aspect, there is provided a folded article made from the coated foldable paper-based substrate described herein or obtained by the processes described herein.

Other objects, advantages and features of the present invention will become more apparent upon reading of the following non-restrictive description of embodiments thereof, with reference to the accompanying drawings.

BRIEF DESCRIPTION OF THE FIGURE

The FIGURE is an image of a cross section of a cardboard coated with an aqueous based coating according to an embodiment obtained by Scanning Electron Microscopy (SEM).

DETAILED DESCRIPTION

A paper-based substrate coated with water-based coatings which is foldable and possesses barrier properties such as water-resistance, grease or oil resistance, heat resistance, odor barriers, moisture resistance, heat sealability or any combination thereof will be described.

In the present description the term "foldable" indicates that the paper-based substrate once coated, will usually be folded in use. The folding can be done either manually or mechanically. Moreover, the coated foldable paper-based substrate can also be scored to make it easier to fold. The paper-based substrate once coated can be provided to the user either in an unfolded form and is thus referred to as being "foldable" or can be provided already folded. It can also be provided to the user in a scored unfolded form to make it easier the folding step. The paper-based substrate may be scored and folded at different positions, for example for erecting boxes of various forms.

Broadly described, the foldable paper-based substrate is coated on at least one of its surface with a coating comprising a primer coat providing flexibility to the coating and a top coat providing barrier properties to the coating. For some applications, the coating, i.e. the primer and top coats, can be applied on both surfaces of the paper-based substrate. The primer and top coats contain water-based compositions and the resulting coating is therefore repulpable.

Primer Coat

The primer coat of the water-based coating is the coat which is directly applied to the surface of the paper-based substrate. The primer coat provides the required flexibility to limit and/or avoid the formation of cracks at the folds of a paper-based article erected using a paper-based substrate coated with such coating. Hence, the primer coat also provides flexibility to limit and/or avoid the formation of cracks when the coated paper-based substrate is scored before to be folded. With such a flexible primer coat, the barrier properties of the resulting coating, imparted at least by the top coat, will be maintained even when the paper-based substrate is folded.

The primer coat comprises an aqueous dispersion of a polymer or copolymer providing a determined flexibility to the resulting coating. The aqueous dispersion of the primer coat does not contain wax, i.e. it is wax-free.

The aqueous dispersion of the primer coat is characterized by its flexibility. The flexibility of a dry film resulting from the aqueous dispersion is measured as the percentage of elongation-to-break. The TAPPI Standard Test Method No. T 457 can be used to measure the flexibility of the film.

More particularly, the aqueous dispersion of the primer coat is characterized in that a dry film thereof having a thickness from about 1.0 to about 2.5 mm has a flexibility of at least 1100%. In one embodiment, the aqueous dispersion of the primer coat is characterized in that a dry film thereof having a thickness from about 1.6 to about 1.7 mm has a flexibility of at least 1500%.

The term "about", as used herein before any numerical value, means within an acceptable error range for the particular value as determined by one of ordinary skill in the art. This error range may depend in part on how the value is measured or determined, i.e. the limitations of the measurement system. It is commonly accepted that a 10% precision measure is acceptable and encompasses the term "about".

For technical and experimental reasons, the flexibility of the dried aqueous dispersion is determined for a dry film having a thickness of at least about 1 mm. However, one skilled in the art will understand that the primer coat once applied to the paper-based substrate and after drying thereof will have a thickness in the micron range, for example in the range from about 10 μm to about 15 μm.

In an embodiment, the solids content of the primer coat is from about 30 wt % to about 70 wt %. This solids content may be from about 45 wt % to about 55 wt %. Moreover, the viscosity of the primer coat may be from about 50 cP to about 10000 cP (measured at low shear 20 rpm using a Brookfield viscosimeter and spindle #3). In one embodiment, the primer coat viscosity is from about 100 cP to about 5000 cP. In another embodiment, the primer coat viscosity is about 4500 cP. If necessary, a thickening agent can be added to the aqueous dispersion to reach the required viscosity for the primer coat. The thickening agent includes water-in-oil emulsions which are inert towards the polymeric constituent (s) of the primer coat mentioned below. Examples of thickening agent include water-in-oil emulsions of acrylic acid-acrylamide copolymers. The products commercialized as Sterocoll® BL or Sterocoll® FS are examples of thickening agent which can be used in the primer coat. The quantity of thickening agent is usually less than about 1 wt % of the weight of the aqueous dispersion. Quantities as little as 0.1 wt % may be sufficient to obtain the required viscosity.

The polymer or copolymer present in the aqueous dispersion of the primer coat may include an acrylic polymer, an acrylic copolymer, a styrene-butadiene copolymer, a styrene-acrylate copolymer, a styrene-acrylonitrile copolymer, a styrene-acrylonitrile-acrylate copolymer, a polyurethane, a polyvinylalcohol, a polyvinylacetate, a dextrin, a modified starch, an asphalt emulsion, corn starch, polyethylene, nylon, polypropylene, a polyhydroxyalkanoate (PHA), or any mixtures thereof. These polymers or copolymers may also be present in the aqueous dispersion in the form of their salts. By "acrylic polymer" or "acrylic copolymer" it is meant that the polymer is based on one acrylic monomer and the copolymer based on at least two different acrylic monomers. The acrylic monomers can be acrylic acids or acrylates.

The aqueous dispersion comprised in the primer coat may be commercially available under various trademarks and from various manufacturers. Aqueous dispersion of styrene-butadiene copolymers containing for example the product Styronal® BN 4606 X from BASF (also known under the name Epotal® NX 4646) or the product commercialized under the reference XU 31616 by Styron, may be used for the primer coat. The styrene-acrylonitrile-acrylate copolymer which may be present in the aqueous dispersion of the primer coat can be a copolymer of n-butylacrylate, styrene and acrylonitrile. In an embodiment, the product commercialized as Acronal® S 504, containing a copolymer of n-butylacrylate, styrene and acrylonitrile, is used as the aqueous dispersion for the primer coat.

Other examples of aqueous dispersion which can be used for the primer coat comprise Tribinder commercialized by Tri-Tex Co Inc. or Aqualene® 5050 commercialized by Aqua Based Technologies. Both of these products comprise acrylic based polymers.

In another embodiment, the primer coat may further include a defoaming agent (surfactant) to prevent/limit foam formation in the aqueous dispersion of the primer coat, and thus prevent/limit discontinuity of the film resulting from the primer coat application onto the paper-substrate. The defoaming agent may include the product Advantage M1251™ commercialized by the company Ashland, the product Etingal® L or Foambrake® 798 both commercialized by BASF, or the product Foamblast® 301S commercialized by the company L.V. Lomas. Other defoaming agents may be used in the primer coat and a person skilled in the art would be able to select an appropriate defoaming agent. The selection of a defoaming agent could be carried out using the following method. Pour about 10 ml of the aqueous dispersion of the primer coat containing a defoaming agent in a 100 ml graduated cylinder provided with a ground joint using a funnel to avoid spilling the dispersion on the wall of the cylinder. Write down the value of the initial volume (in ml) of the aqueous dispersion. Connect the graduated cylinder to a Büchner flask (Erlenmeyer vacuum flask) connected to a vacuum pump. Start the pump. Under vacuum, gas bubbles entrapped in the aqueous dispersion are allowed to blow up and the volume of the mixture increases. Wait for stabilization of the mixture volume. Write down the value of the final volume (in ml). The previous described steps can be repeated using different defoaming agents in the aqueous dispersion. Calculate the difference between the final volume and the initial volume for each tested defoaming agent. The best defoaming agent will be the one for which the difference between the final volume and the initial volume calculated is the smallest one. When a defoaming agent is added to the primer coat, only very small quantities are required. Generally, an amount of less than about 0.1 wt % of defoaming agent based on the total weight of the primer coat is required. Quantities as little as 0.05 wt % may be sufficient to provide the required anti-foam properties.

Even if, as mentioned above, the main function of the primer coat is to provide flexibility to the final coating, it is worth noting that the primer coat may also provide, depending on its nature, some barrier and/or resistance properties to the final coating. For example, the primer coat may provide water resistance and/or grease or oil resistance to the coated paper-based substrate.

Top Coat

The top coat is the coat which is applied over the dried primer coat. More details about the process of applying the coating are provided below. The purpose of the top coat is to provide further barrier/resistance properties to the coated paper-based substrate. The properties imparted by the top coat to the coated paper may include water resistance, grease or oil resistance, heat resistance, odor barrier, moisture barrier, and/or heat sealability.

The top coat comprises an aqueous dispersion of polymers or copolymers which are capable to provide the above mentioned properties. Moreover, the top coat is blocking resistant. In other words, the top coat is substantially not sticky. As is well known in the art, blocking resistance means that the coated side of the substrate will not stick to the uncoated side thereof within a wound roll. Different methods known in the art can be used to determine if a coating is blocking resistant. For example, a method uses a heat sealer on which only the upper clamp is heated. A sample of a coated board facing an uncoated board is placed into the equipment and pressed for 5 minutes at 5 psi and 70° C. Then, the two pieces of board are removed from heat sealer clamps and cooled down to 23° C. and 50% relative humidity (RH). Once at 23° C., the two pieces are separated and observation for peeled off fibers or peeled off coating is performed. When the coating is blocking resistant, no fiber or coating is expected to peel.

The aqueous dispersion of the top coat is also characterized in that a dry film thereof having a thickness from about 1.5 to about 2.5 mm has a flexibility of at least 570%. In an embodiment, the flexibility of the dry film is superior to 600% for a film with a thickness from about 1.6 to about 1.7 mm.

As for the primer coat, the flexibility of the dry film resulting from the aqueous dispersion of the top coat is measured as the percentage of elongation-to-break using the TAPPI Standard Test Method No. T 457.

Even if for technical and experimental reasons, the flexibility of the dried aqueous dispersion is determined for a dry film having a thickness of at least about 1 mm, the skilled person in the art will understand that the top coat once applied to the paper-based substrate and after drying thereof will have a thickness in the micron range, for example in the range from about 0.5 μm to about 10 μm.

In an embodiment, the solids content of the top coat is from about 10 wt % to about 70 wt %. This solids content may be from about 20 wt % to about 40 wt %. In other embodiments, the top coat may have a solids content from about 25 wt % to about 37 wt %.

The viscosity of the top coat may be from about 40 cP to about 10000 cP (measured at low shear 20 rpm using a Brookfield viscosimeter and spindle #3). In one embodiment, the top coat viscosity is from about 40 cP to about 250 cP. If necessary, a thickening agent can be added to the aqueous dispersion to reach the required viscosity for the top coat, similarly to the primer coat. Examples of thickening agent thus include water-in-oil emulsions of acrylic acid-acrylamide copolymers (e.g. Sterocoll® BL or Sterocoll® FS). The quantity of thickening agent is usually less than about 1 wt % of the weight of the aqueous dispersion. Quantities as little as 0.1 wt % may be sufficient to obtain the required viscosity.

Even if the aqueous dispersion of the top coat and the one of the primer coat are different, the polymers or copolymers present in the aqueous dispersion of the top coat can be of the same nature than the one in the primer coat aqueous dispersion. Hence, the aqueous dispersion of the top coat may comprise acrylic based polymers or copolymers, styrene-butadiene copolymers, styrene-acrylate copolymers, styrene-acrylonitrile copolymers, styrene-acrylonitrile-acrylate copolymers, polyurethanes, polyvinylalcohols, polyvinylacetates, dextrins, modified starches, asphalt emulsions, corn starch, polyethylene, nylons, polypropylene, polyhydroxyalkanoates (PHA) or any mixtures thereof. These polymers or copolymers may also be present in the aqueous dispersion in the form of their salts. By "acrylic based polymer" or "acrylic based copolymer" it is meant that the polymer is based on one acrylic monomer and the copolymer based on at least two different acrylic monomers. The acrylic monomers can be acrylic acids or acrylates.

The aqueous dispersion comprised in the top coat may be commercially available under various trademarks and from various manufacturers. Examples of aqueous dispersions for the top coat include products Michem®Coat 81 and Michem®Coat 82 which comprise a styrene-butadiene copolymer. VaporCoat® 2200R from the company Michelman, the products Spectra-Guard™ 3007BK and Spectra-Guard™ 3003 both from the company Spectra-kote Corp., Tribinder from the company Tri-Tex Co inc., and Aqualene® 5050 from Aqua Based Technologies which all are acrylic based products, are other examples of aqueous dispersion which can be used for the top coat. Another aqueous dispersion useful for the top coat is the product commercialized as ESACOTE® PU DP 170/N which comprise a polyurethane. The product Cartabond® SMH Liquid from the company CLARIANT, which is a polyvinylalcohol based aqueous dispersion, can also be used to make the top coat.

In an embodiment, the aqueous dispersion of the top coat does not contain wax as for the aqueous dispersion of the top coat. It is worth mentioning that the above examples of commercial products to be used for the top coat are all wax-free except for VaporCoat® 2200R.

In another embodiment, the top coat is substantially free of mineral charges or free of mineral charges having a particle size equal to or above 1 μm.

In a further embodiment, the aqueous dispersion of the top coat may contain a defoaming agent. The defoaming agent may be present in the commercial products to be used for the top coat or can be added separately to the aqueous dispersion.

Coated Foldable Paper-Based Substrate

As will be detailed below, the above defined primer coat and top coat are applied successively to the surface of a paper-based substrate to obtain a coated paper-based substrate. As previously explained, the paper-based substrate is also foldable and can be used once folded to make various types of articles (e.g. boxes, trays etc. . . . ). A "paper-based substrate" refers to any type of cellulosic fiber-based product which can be folded either manually or mechanically. For example, the foldable paper-based substrate can be any suitable wood-fiber based material, such as recycled or virgin liner, medium, fine paper, newspaper, chipboard, paperboard, kraftpak paper, molded pulp and the like. The paper-based substrate can be a substantially flat substrate. However, it can also be a three-dimensional substrate, for example a three-dimensional substrate from molded pulp (e.g. molded pulp trays, eggs box etc. . . . ).

In an embodiment, the paper-based substrate has a basis weight from about 40 g/m$^2$ to about 1000 g/m$^2$. In another embodiment, the basis weight is from about 200 g/m$^2$ to about 400 g/m$^2$.

The paper-based substrate is coated with the primer coat and then the top coat on at least one of its surface. In an embodiment, when the substrate is flat, its other surface can also be coated. It is worth mentioning that the foldable coated substrate can also be embossed. In the case of a three-dimensional substrate, only one surface or all the surfaces (different sides, inside or out surfaces etc. . . . ) of the substrate can be coated.

Process

An embodiment of a process for coating the foldable paper-based substrate using the above defined primer coat and top coat will be now described.

The process for obtaining the foldable coated paper-based substrate comprises a step of applying the primer coat on at least one surface of the paper-based substrate followed by a step of applying the top coat over the top coat. The process also comprises drying the coats to obtain the foldable coated paper-substrate. While the primer coat is generally dried before application of the top coat thereon, some coating methods known in the art also allows applying the primer coat to the paper surface and then the top coat directly over the primer coat without having to dry the primer coat beforehand, as will be explained below. In an embodiment, the primer coat and top coat may be applied successively another time to the other surface of the substrate.

When the process involves drying each coat after application thereof on the paper-based substrate, one may use a machine including two systems of a coater/dryer in series. The primer coat is then first applied onto the paper substrate through the first coater and then dried. The resulting primer coat is very flexible and usually also sticky. In the case where the paper substrate is substantially flat, it is thus not possible to rewind the paper before the application of the top coat and the top coat is thus immediately applied on the dried primer coat. Such is possible by using a second coater which receives the substrate coated with the primer coat and applying the top coat thereon. Finally, the substrate is passed through a second dryer to dry the top coat and obtaining the foldable coated substrate.

Examples of coaters that can be used to apply the primer and top coats to a substantially flat substrate include rod coaters, blade coaters, air knife coaters, curtain coaters, slot die coaters, iso-bar rod coaters, gravure coaters, reverse gravure coaters. Alternatively, the coats can be applied by flexography. In an embodiment, the primer and top coats are applied using a rod coater, a blade coater, or a curtain coater.

When using a rod coater, it may be advantageous to use a rod provided with a resilient tip metering element to obtain a substantially homogeneous application, especially on recycled paper having a roughness surface (peak-to-valley roughness). Indeed, when using such a rod, the resilient tip metering element allows application of the coat even in the valleys at the surface of paper-substrate. This also allows obtaining a coat with a uniform thickness as little as possible and good contour-coating. An example of rod provided with such a resilient tip metering element is the INVO® Tip commercialized by the company UMV.

When a curtain coater or slot die coater is used, it is possible to apply only one layer of each of the primer and top coats, but it can also be possible to apply multiple layers of each one of the coats. When multiple layers of the same coat are applied there is no need to dry the coat between each layer application. The application of multiple layers of the same coat can be useful for obtaining more uniform coatings and/or the required thickness thereof.

As mentioned above, the process may not require drying the primer coat before application of the top coat. This is particularly possible using a curtain coater or slot die coater where application of the top coat immediately follows application of the primer coat onto the substrate. Then both the primer and top coats may be dried at the same time.

If the paper-based substrate is molded pulp (e.g. molded pulp box such as eggs box), the primer and top coats are applied using a shower or a sprayer. A first shower or sprayer applies the primer coat to the surface of the substrate and then the primer coat is dried in a dryer. Then, the top coat is applied over the dried primer coat also using a shower or sprayer and the top coat is dried. Using a shower or a sprayer also allows applying multiple layers of each one of the primer and top coats, if necessary.

In an embodiment, the primer coat is applied to the surface of the paper in quantities ranging from about 5 to about 20 $g/m^2$. In another embodiment, the quantity of primer coat applied to the paper-based substrate surface can be from about 10 to about 13 $g/m^2$.

The primer coat once coated and dried is substantially uniform. Here, "substantially uniform" means that the primer coat once dried forms a film substantially free of defects which could cause cracking of the top coat if the coated paper-based substrate is folded at the position of the defect.

The top coat can be applied to the dried primer coat in quantities ranging from about 0.1 to about 15 $g/m^2$. In another embodiment, the top coat is applied in quantities ranging from about 0.5 to about 5 $g/m^2$.

The drying temperature of the primer coat can be from about 40° C. to about 95° C. In some embodiments, a temperature ranging from about 50° C. to about 70° C. is sufficient to dry the primer coat.

The top coat may be dried at a temperature ranging from about 40° C. to about 95° C. In other embodiments, the top coat is dried at a temperature ranging from about 60° C. to about 80° C.

When the primer coat and the top coat are applied successively without drying the primer coat before application of the top coat thereof using a curtain coater or slot die coater, both coats may be dried at a temperature ranging from about 40° C. to about 95° C.

During the drying step, boiling out of the coat layers should be avoided out. This can be achieved by adjusting the heat energy which is applied to reach the drying temperature to the web speed, and thereby allowing the films to dry without boiling.

Once both the primer coat and the top coat are dried, the coated substrate can be folded either on the coating site or in another site. The coated substrate can be provided to the user unfolded or already folded. In an embodiment, the coated substrate is scored before folding. Some care must be taken when scoring in order so the scoring blades do not create cuts in the coating barrier. Pressure and scoring platen must be in good operating conditions so coating is not damaged.

The coated paper-based substrate is useful for many different applications depending on the nature of the substrate itself and the nature of the primer and top coats. For example, coated flat paperboard or cardboard can be used to erect boxes having water resistance and/or grease resistance and/or heat resistance and/or that are heat sealable such as food take-out boxes, or to erect boxes having an odor barrier and/or grease resistance such as detergent boxes (e.g. boxes for Bounce® dryer sheets).

Molded pulp based articles which can be coated with the primer and top coats include articles usually comprising a container to receive goods and a cover protecting the goods inside the box, the cover and the container being connected along a fold of the article. Examples of such articles include food or drink boxes (e.g. eggs box, vine bottle box), boxes for personal care products, protecting boxes for electronic devices, or any other fragile articles, to name a few.

EXAMPLES

Example 1

The flexibility of different aqueous dispersions which can be used for the primer or top coat to be applied to the foldable paper-based substrate was determined. The methodology which was used for the flexibility determination is detailed below. The experimental results are provided in Table 1.

The liquid aqueous dispersion was diluted with water to obtain a solids content of 25-30% (w/w) and filtered through a 560 μm screen. A weighted amount of the diluted sample was added to a PTFE dish (125 mm of diameter) in order to obtain about 12 g of dry solids. The amount of solids in the PTFE dish depends on the aimed thickness (1-2.5 mm) of the dry film to be prepared. The liquid was allowed to evaporate at room temperature and the resulting film was removed from the PTFE dish, heated at 105° C. for 15 minutes and then allowed to reach room temperature. After thickness measuring, the dry film was cut into a rectangular strip of 25 mm×51 mm. The mechanical properties of the film were determined using a tensile testing instrument (Instron™ 5565 with a 1N load cell). The grip separation was set at 10 mm and the rate of grip separation at 25.4 mm/min. The flexibility of the dry film was determined according to Standard Test Method No. T 457. TAPPI Standard Test Method No. T 494 was used to determine the tensile value, elongation, modulus, and TEA (Total Energy Absorption) value of the dry film.

TABLE 1

| Aqueous dispersion | Thickness (mm) | Elongation (mm) | Elongation (%) | TEA ($kJ/m^2$) | TEA ($kJ/m^3$) | Modulus ($N/mm^2$) | Tensile (N) | Tensile/ thickness (N/mm) |
|---|---|---|---|---|---|---|---|---|
| Acronal ® S504 NA | 1.7 | 206 | 2060 | 51 | 30 | 0.17 | 135 | 79 |
| | 1.9 | 162 | 1620 | 41 | 21 | 0.26 | 162 | 85 |
| | 2.3 | 114 | 1140 | 27 | 12 | 0.16 | 98 | 43 |
| Styronal ® BN 4606 X | 1 | 135 | 1350 | 40 | 40 | 3.1 | 133 | 133 |
| | 1.6 | 149 | 1490 | 40 | 25 | 1.3 | 129 | 81 |
| | 2.3 | 118 | 1180 | 40 | 18 | 1.8 | 125 | 54 |
| XU 31616 | 2.2 | 116 | 1160 | 66 | 30 | 3.7 | 325 | 148 |
| Tribinder | 2 | 116 | 1160 | 15 | 7.5 | 0.15 | 74 | 37 |
| Michem ®Coat 81 | 1.7 | 98 | 980 | 35 | 21 | 15 | 140 | 82 |
| Michem ®Coat 82 | 1.9 | 116 | 1160 | 32 | 17 | 0.67 | 114 | 60 |
| ESACOTE ® PU DP 170/N | 1.7 | 80 | 800 | 43 | 25 | 1 | 162 | 95 |
| Spectra-Guard ™ 3007BK | 2.3 | 68 | 680 | 15 | 6.6 | 0.61 | 77 | 33 |
| VaporCoat ® 2200R | 2.1 | 57 | 570 | 8 | 3.8 | 0.19 | 28 | 13 |
| Cartabond ® SMH Liquid | 2.2 | 58 | 575 | 73 | 33 | 3.5 | 402 | 183 |

Example 2

A cardboard sample coated with a primer coat and a top coat (Recipe 2B) was tested for its resistance to the grease of Bounce® dryer sheets and its barrier odor properties. Moisture Vapour Transfer Rate (MVTR), water resistance (Cobb test) and grease resistance (3M kit test) were also measured. MVTR was determined according to the TAPPI Standard Test Method No. T 464, the Cobb test performed according to TAPPI Standard Test Method No. T 441 and the grease resistance determined according to TAPPI Standard Test Method No. T 559.

Bounce® odor test was performed as follows. A panel of four persons was allowed to smell blinded envelopes containing Bounce® sheets. One envelop was coated with polyethylene, another with Recipe 2B. A blank sample consisted of an uncoated envelop. The qualitative evaluation scale ranged from 0 to 5 where a result of 5 represented the strongest odor that can be detected. The blank uncoated sample was rated 5.

Bounce® grease test was performed as follows. Grease from Bounce® sheets was extracted and about 1 g of the solid grease extracts were poured onto the coated cardboard. The sample was then heated at 105° C. No grease migration through the coated board was observed after 8130 minutes at 105° C.

The results were compared with those obtained with a polyethylene coating. Experimental data are provided in Table 2.

The cardboard used in this example was Microcycle® 18 pts from Cascades Jonquière (basis weight 320 g/m$^2$). The primer coat included Acronal® S504 (99.96 wt %) and Advantage M1251™ (0.04 wt %) as a defoaming agent. The viscosity of the primer coat was 825 cP. The top coat included Spectra-Guard™ 3003 (viscosity of about 65 cP). The primer coat was applied using a rod coater (Rod #18; 12 g/m$^2$) and dried at 60° C. using a gas infrared dryer. The top coat was applied using a rod coater (Rod #0; 3 g/m$^2$) and dried at 70° C. using an electric infrared dryer.

The Figure represents a SEM image of the coated cardboard with Recipe 2B after folding. The coating is visible at the surface of the cardboard with the grayish layer being the primer coat and the whitish layer being the top coat. The coating is substantially uniform and no crack is observed at the fold.

TABLE 2

| Sample (coating) | Coat weight (g/m$^2$ dry) | 3M kit test | Bounce ® grease test (minutes) | Cobb (g/m$^2$ 10 min) | MVTR (g/m$^2$/ day) | Bounce ® odor test |
|---|---|---|---|---|---|---|
| 2B | 15 | >12 | >8130 | <2 | 95 | Not detected |
| Poly-ethylene | 15 | >12 | >240 | 0 | 50 | 3.5 |

Recipe 2B achieves a good resistance to Bounce® extracted grease on flat board and on creased lines. After 8130 minutes, no staining was observed. Moreover, no odor was detected during the odor test performed on the envelop coated with recipe 2B.

Example 3

Take-out boxes made from cardboard samples coated with a primer coat and a top coat as detailed below, were tested for their resistance to different conditions including water resistance (Cobb test, TAPPI T 441), grease/oil resistance (3M kit test, TAPPI T 559), blocking resistance and heat sealability. They were also tested to evaluate how creasing influence penetration of four different food products including, mazola oil, salad dressing (vinaigrette), spaghetti sauce and coffee.

Blocking resistance and heat sealability were determined using a thermosealer (Sencorp Systems Inc. model 12-AS/1) as follows. Samples of coated board of 12 inches width and about 2½ to 3 inches length were prepared and placed into the thermosealer facing an uncoated board. The uncoated surface of the coated board was facing the upper clamp of the thermosealer which was heated. Determination of the blocking resistance was performed by pressing the boards for 5 minutes at 5 psi and 70° C. Determination of the heat sealability was performed by pressing the boards for 3 seconds at 24 psi and 191° C. Then, the two pieces of board were removed from the thermosealer clamps and cooled down. The two pieces were separated and observation for peeled off fibers or peeled off coating was performed. When the test "passed", no fiber or coating was peeled off and when the test "failed", some fibers and/or coating was peeled off.

The resistance tests to mazola oil, salad dressing (vinaigrette), spaghetti sauce and coffee "passed" when no penetration spot were observed at the creases on the sample after 24 hours. The test "failed" when penetration spots were observed.

Experimental results are provided in Table 3.

The cardboard used in this example was Cascades East Angus Conquest® 18 pts (basis weight 320 g/m$^2$). The primer coat included Acronal® S504 (99.66 wt %), Advantage M1251™ (0.04 wt %) as a defoaming agent and Sterocoll® BL (0.3 wt %) as a thickening agent. The viscosity of the primer coat was 1500 cP. Different top coats were used, namely Spectra-Guard™ 3007BK, Spectra-Guard™ 3003 and VaporCoat® 2200R (viscosity 50-250 cP, 50-250 cP and 200-800 cP respectively). The primer coat was applied using a rod coater (Rod #18; 13 g/m$^2$) and dried at 60° C. using a gas infrared dryer. The top coats were applied using a rod coater with two different rods (Rod #0, 3 g/m$^2$; or Rod #10; 5 g/m$^2$) and dried at 70° C. using an electric infrared dryer.

Sample #12 passed all the tests. The combination Acronal® S504/Spectra-Guard™ 3007BK provides good barrier/resistance properties to the cardboard coated with the same. Sample #8 using VaporCoat® 2200R as the top coat and sample #9 using Spectra-Guard™ 3003 as the top coat also gives good results.

TABLE 3

| Sample ID | Mazola oil (After 24 hrs) | Spaghetti sauce (After 24 hrs) | Vinaigrette (After 24 hrs) | Coffee (After 24 hrs) | Blocking (70° C./ 5 psi/ 5 min) | Heat Seal (191° C./ 24 psi/ 3 s) | Cobb 30 min ($g_{water}$/m$^2$) | 3M kit test |
|---|---|---|---|---|---|---|---|---|
| #7) Acronal ® S504 (R-18/18 psi) + VaporCoat ® 2200R (R-10/18 psi) | Failed | Passed | Passed | Passed | Passed | Passed | 4 | >12 |
| #8) Acronal ® S504 (R-18/18 psi) + VaporCoat ® 2200R (R-0/18 psi) | Passed | Passed | Passed | Passed | Passed | Passed | 9 | 11 |

TABLE 3-continued

| Sample ID | Mazola oil (After 24 hrs) | Spaghetti sauce (After 24 hrs) | Vinaigrette (After 24 hrs) | Coffee (After 24 hrs) | Blocking (70° C./ 5 psi/ 5 min) | Heat Seal (191° C./ 24 psi/ 3 s) | Cobb 30 min ($g_{water}/m^2$) | 3M kit test |
|---|---|---|---|---|---|---|---|---|
| #9) Acronal ® S504 (R-18/18 psi) + Spectra-Guard ™ 3003 (R-10/18 psi) | Passed | Passed | Passed | Passed | Passed | Passed | 9 | 11 |
| #10) Acronal ® S504 (R-18/18 psi) + Spectra-Guard ™ 3003 (R-0/18 psi) | Failed | Passed | Passed | Passed | Passed | Failed | 17 | 10 |
| #12) Acronal ® S504 (R-18/18 psi) + Spectra-Guard ™ 3007 BK (R-0/18 psi) | Passed | Passed | Passed | Passed | Passed | Passed | 11 | >12 |

Example 4

Take-out boxes made from chipboard samples coated with a primer coat and a top coat as detailed below, were tested to evaluate how creasing influence penetration of four different food products including, corn oil, salad dressing, spaghetti sauce and coffee. The results were compared with take-out boxes made from chipboard samples coated with polyethylene or the coating commercialized as "EC-40" by the company Smart Planet Technology (about 60 wt % polyethylene and about 40 wt % fillers). Observation of penetration spots both on the inside and outside of the boxes was performed after 30 minutes, 6 hours and 24 hours following application of the food products.

Experimental results are provided in Table 4.

The chipboard used in this example was EcoTect™ Tan Bending Chip from Sonoco (18 pts; basis weight 300 g/m$^2$). The primer coat included Acronal® S504 (99.21 wt %), Advantage M1251™ (0.04 wt %) as a defoaming agent and Sterocoll® BL (0.75 wt %) as a thickening agent. The viscosity of the primer coat was 4500 cP. The top coat used was Spectra-Guard™ 3007BK (viscosity 50-250 cP). The coats were applied using a rod coater provided with an INVO®Tip rod (primer coat: 12 g/m$^2$; top coat: 3 g/m$^2$). The primer coat was dried at 70° C. and the top coat at 60° C. using an electric infrared dryer.

Crease Method:

Coated boards were cut in 10½ inches MD (Machine Direction)×9½ inches CD (Cross Direction) pieces. Most of the time, two fine paper sheets were placed on both sides of the coated board (four fine paper sheets) prior to crease. In some cases, four paper sheets were not enough to prevent cutting in crease lines, three fine paper sheets were placed under the coated board. If one of the paper sheet was cut in a crease line, the coated board sheet was discarded and one more fine paper sheet was used. The creases were performed placing the male portion of the die in contact with the uncoated side of the board. A pressure of 50 psi was used.

Manual Construction of Boxes:

Creases were fold by hand at 180° applying a gentle pressure (no measuring rule was used). Tape (Grand&Toy #99837) was used prior to the hot melt application to glue the corners of the boxes.

Condiments Penetration Tests:

Corn oil, spaghetti sauce and salad dressing were put inside boxes at ambient temperature. Coffee and spaghetti sauce were hot when poured inside the boxes.

As shown in Table 4, the sample coated with a primer coat comprising Acronal® S504 and a top coat comprising Spectra-Guard™ 3007BK is resistant to spaghetti sauce and coffee even after 24 h. Its resistance to salad dressing after 30 minutes is better than for the sample coated with polyethylene and similar to the sample coated with EC-40. Its resistance to corn oil after 30 minutes is comparable to the one of the sample coated with EC-40.

TABLE 4

| Coating | Acronal ® S504 + Spectra-Guard ™ 3007BK | EC-40 | Polyethylene |
|---|---|---|---|
| Corn oil (after 30 minutes) | Few spots on the inside and two on the outside | Few spots on the inside and two on the outside | Few spots on the inside and one on the outside |
| Spaghetti sauce (after 30 minutes) | No spot | No spot | No spot |
| Salad dressing (after 30 minutes) | No spot | No spot | One spot on the crease |
| Coffee (after 30 minutes) | No spot | No spot | No spot |
| Corn oil (after 6 h) | Many spots on the inside and few on the outside | Many spots on the inside and two on the outside | Few spots on the inside and two on the outside |
| Spaghetti sauce (after 6 h) | No spot | No spot | No spot |
| Salad dressing (after 6 h) | Many spots on the crease inside the box and one on the outside | Few spots on the inside and one on the outside | One spot on the crease which passes through the board |
| Coffee (after 6 h) | No spot | No spot | No spot |
| Corn oil (after 24 h) | Many spots on the inside and few on the outside | Many spots on the inside and few on the outside | Few spots on both sides |
| Spaghetti sauce (after 24 h) | No spot | No spot | No spot |
| Salad dressing (after 24 h) | Many spots on the inside crease and one on the outside | Few spots on the inside and one on the outside | Two spots on the crease and one of them passes through the board |
| Coffee (after 24 h) | No spot | No spot | No spot |

The above-described embodiments and examples are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The scope of the invention is therefore intended to be limited solely by the scope of the appended claims.

The invention claimed is:

1. A process for preparing a coated foldable paper-based substrate from a foldable paper-based substrate having two surfaces, the process comprising:

applying a primer coat having a viscosity from about 4500 cP to about 10000 cP measured on a Brookfield viscometer at 20 rpm with a spindle 3, to one of the surfaces of the foldable paper-based substrate, wherein the primer coat comprises a wax-free aqueous dispersion of a styrene-butadiene copolymer, a styrene-acrylate copolymer, a styrene-acrylonitrile copolymer, a styrene-acrylonitrile-acrylate copolymer or any mixtures thereof, said wax-free aqueous dispersion being characterized in that a dry film thereof has a flexibility measured as the percentage of elongation-to-break of at least 1100% for a film thickness from about 1.0 to about 2.5 mm, drying the primer coat thereby forming a dried primer coat, applying a top coat having a viscosity from about 40 cP to about 10000 cP measured on a Brookfield viscometer at 20 rpm with a spindle 3, over the dried primer coat, wherein top coat is blocking resistant and comprises an aqueous dispersion of a polymer or copolymer capable of providing at least one of water resistance, grease or oil resistance, heat resistance, an odor barrier, a moisture barrier, or heat sealability to the coated foldable paper-based substrate, wherein said top coat is characterized in that a dry film thereof has a flexibility measured as the percentage of elongation-to-break of at least 570% for a film thickness from about 1.5 to about 2.5 mm, and drying the top coat thereby forming the coated foldable paper-based substrate.

2. The process of claim 1, further comprising repeating the steps of applying the primer coat, drying the primer coat, applying the top coat, and drying the top coat to the other surface of the foldable paper-based substrate.

3. The process of claim 1, wherein the primer coat is applied to the one of the surfaces of the foldable paper-based substrate in a quantity from about 5 to about 20 $g/m^2$.

4. The process of claim 1, wherein the primer coat is applied to the one of the surfaces of the foldable paper-based substrate in a quantity from about 10 to about 13 $g/m^2$.

5. The process of claim 1, wherein the top coat is applied to the dried primer coat in a quantity from about 0.1 to about 15 $g/m^2$.

6. The process of claim 4, wherein the top coat is applied to the dried primer coat in a quantity from about 0.5 to about 5 $g/m^2$.

7. The process of claim 1, wherein the primer coat is dried at a temperature from about 40° C. to about 95° C. and the top coat is dried at a temperature from about 40° C. to about 95° C.

8. The process of claim 1, wherein the primer coat is dried at a temperature from about 50° C. to about 70° C. and the top coat is dried at a temperature from about 60° C. to about 80° C.

9. The process of claim 1, wherein the foldable paper-based substrate is flat and the primer coat and top coat are applied using a rod coater, a blade coater, an air knife coater, a curtain coater, a slot die coater, an iso-bar rod coater, a gravure coater, or a reverse gravure coater, or applied by flexography.

10. The process of claim 1, wherein the primer coat and top coat are applied using a rod coater provided with a resilient tip metering element.

11. The process of claim 1, wherein a curtain coater is used to apply the primer coat and top coat and either the primer coat or the top coat or both are applied in multiple layers.

12. The process of claim 1, wherein the foldable paper-based substrate is molded pulp and the primer coat and top coat are applied using a shower or a sprayer.

13. The process of claim 1, wherein the primer coat has a viscosity from about 4500 cP to about 5000 cP measured on a Brookfield viscometer at 20 rpm with a spindle 3.

14. The process of claim 1, wherein the primer coat comprises a copolymer of n-butylacrylate, styrene and acrylonitrile or a styrene-butadiene copolymer.

15. The process of claim 14, wherein the primer coat further comprises a thickening agent.

16. The process of claim 1, wherein the top coat has a viscosity from about 40 cP to about 250 cP, the viscosity being measured on a Brookfield viscometer at 20 rpm with a spindle 3.

17. The process of claim 1, wherein the top coat is free of mineral charges and wax free, and comprises an acrylic based polymer or copolymer, a styrene-butadiene copolymer, a styrene-acrylate copolymer, a styrene-acrylonitrile copolymer, a styrene-acrylonitrile-acrylate copolymer, a polyurethane, a polyvinylalcohol, a polyvinylacetate, a dextrin, a modified starch, an asphalt emulsion, corn starch, polyethylene, nylon, polypropylene, a polyhydroxyalkanoate, or any mixtures thereof.

18. The process of claim 1, wherein the top coat is free of mineral charges and wax free, and the aqueous dispersion of the top coat comprises an acrylic based polymer or copolymer, a styrene-butadiene copolymer, a styrene-acrylate copolymer, a styrene-acrylonitrile copolymer or a styrene-acrylonitrile-acrylate copolymer.

19. The process of claim 16, wherein the aqueous dispersion of the top coat comprises an acrylic based polymer or copolymer.

20. A process for preparing a coated foldable paper-based substrate from a foldable paper-based substrate having two surfaces, the process comprising:

applying a primer coat having a viscosity from about 4500 cP to about 10000 cP measured on a Brookfield viscometer at 20 rpm with a spindle 3, to one of the surfaces of the paper-based substrate, wherein the primer coat comprises a wax-free aqueous dispersion of a styrene-butadiene copolymer, a styrene-acrylate copolymer, a styrene-acrylonitrile copolymer, a styrene-acrylonitrile-acrylate copolymer or any mixtures thereof, said wax-free aqueous dispersion being characterized in that a dry film thereof has a flexibility measured as the percentage of elongation-to-break of at least 1100% for a film thickness from about 1.0 to about 2.5 mm, applying a top coat having a viscosity from about 40 cP to about 10000 cP measured on a Brookfield viscometer at 20 rpm with a spindle 3, over the primer coat, wherein top coat is blocking resistant and comprises an aqueous dispersion of a polymer or copolymer capable of providing at least one of water resistance, grease or oil resistance, heat resistance, an odor barrier, a moisture barrier, or heat sealability to the coated foldable paper-based substrate, wherein said top coat is characterized in that a dry film thereof has a flexibility measured as the percentage of elongation-to-break of at least 570% for a film thickness from about 1.5 to about 2.5 mm, and drying the coats thereby forming the coated foldable paper-based substrate;

wherein applying the primer coat and top coat is performed using a curtain coater or a slot die coater.

* * * * *